US007336181B2

(12) United States Patent
Nowak et al.

(10) Patent No.: US 7,336,181 B2
(45) Date of Patent: Feb. 26, 2008

(54) TAGGING AND TRACKING SYSTEM FOR ASSETS AND PERSONNEL OF A COMMERCIAL ENTERPRISE

(75) Inventors: Brent M. Nowak, San Antonio, TX (US); Michael F. Milam, San Antonio, TX (US); Myron L. Moodie, San Antonio, TX (US); Kenneth A. Oleson, San Antonio, TX (US); Michael J. Lake, San Antonio, TX (US); Sandra G. Dykes, Boerne, TX (US); Larry D. Canady, Ham Lake, MN (US); Charles A. Poer, Humble, TX (US); John E. Fike, Jr., San Antonio, TX (US)

(73) Assignee: Zachry Construction Corporation, San Antonio, TX (US)

( * ) Notice: Subject to any disclaimer, the term of this patent is extended or adjusted under 35 U.S.C. 154(b) by 0 days.

(21) Appl. No.: 11/534,966

(22) Filed: Sep. 25, 2006

(65) Prior Publication Data

US 2007/0018826 A1 Jan. 25, 2007

Related U.S. Application Data

(63) Continuation of application No. 10/782,135, filed on Feb. 19, 2004, now Pat. No. 7,123,149.

(60) Provisional application No. 60/449,013, filed on Feb. 21, 2003.

(51) Int. Cl.
*G08B 13/14* (2006.01)

(52) U.S. Cl. ............................. 340/572.1; 340/539.11; 340/539.13; 340/825.49

(58) Field of Classification Search ..................... None
See application file for complete search history.

(56) References Cited

U.S. PATENT DOCUMENTS 5,886,634 A 3/1999 Muhme ...................... 340/572
5,977,913 A 11/1999 Christ ........................ 342/465

(Continued)

FOREIGN PATENT DOCUMENTS

| | | | |
|---|---|---|---|
| WO | 95/12858 | A1 | 5/1995 |
| WO | 01/84506 | A2 | 11/2001 |
| WO | 02/44865 | A2 | 6/2002 |
| WO | 02/47048 | A2 | 6/2002 |

OTHER PUBLICATIONS

Supplementary European Search Report for European Patent Application No. 04775783.6 (3 pages), Dec. 6, 2006.

(Continued)

*Primary Examiner*—Benjamin C. Lee
*Assistant Examiner*—Son Tang
(74) *Attorney, Agent, or Firm*—Baker Botts L.L.P.

(57) ABSTRACT

An integrated system for tracking assets (tools and materials) and personnel associated with a work site. Personnel are equipped with tracking devices having at least geolocation capability. Assets are tagged with RFID tags, which are interrogated at portals, by mobile scanners, or by personnel tracking devices having RFID reading capability. The tag readers and tracking devices are all in communication with a common "information backbone" and all data is delivered to, and processed by, a common command and control subsystem.

18 Claims, 6 Drawing Sheets

U.S. PATENT DOCUMENTS 6,100,806 A 8/2000 Gaukel .................... 340/573.4
6,373,389 B1 4/2002 Przygoda, Jr. et al. ... 340/572.4
6,396,413 B2 5/2002 Hines et al. ........... 340/825.49
6,774,782 B2 8/2004 Runyon et al. ............. 340/505
6,804,578 B1 * 10/2004 Ghaffari ..................... 700/229
6,853,294 B1 2/2005 Ramamurthy et al. ..... 340/10.1
7,034,683 B2 4/2006 Ghazarian ................ 340/568.1
7,123,149 B2 * 10/2006 Nowak et al. ........... 340/572.1
2003/0132298 A1 * 7/2003 Swartz et al. .......... 235/472.02
2004/0095239 A1 5/2004 Schwart et al. ........ 340/539.13
2005/0078006 A1 4/2005 Hutchins et al. ............ 340/561

OTHER PUBLICATIONS

PCT International Search Report with Written Opinion, PCT/US2004/04957, 8 pages, Mailing Date Jul. 19, 2005.

* cited by examiner

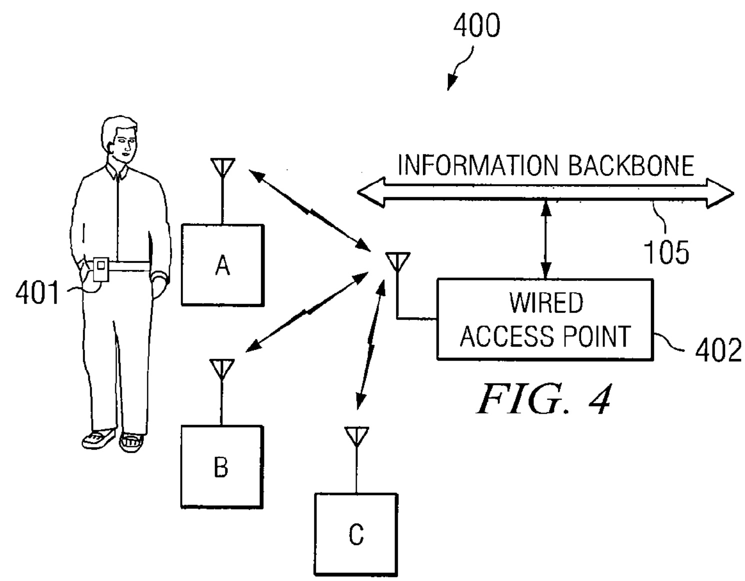
*FIG. 4*
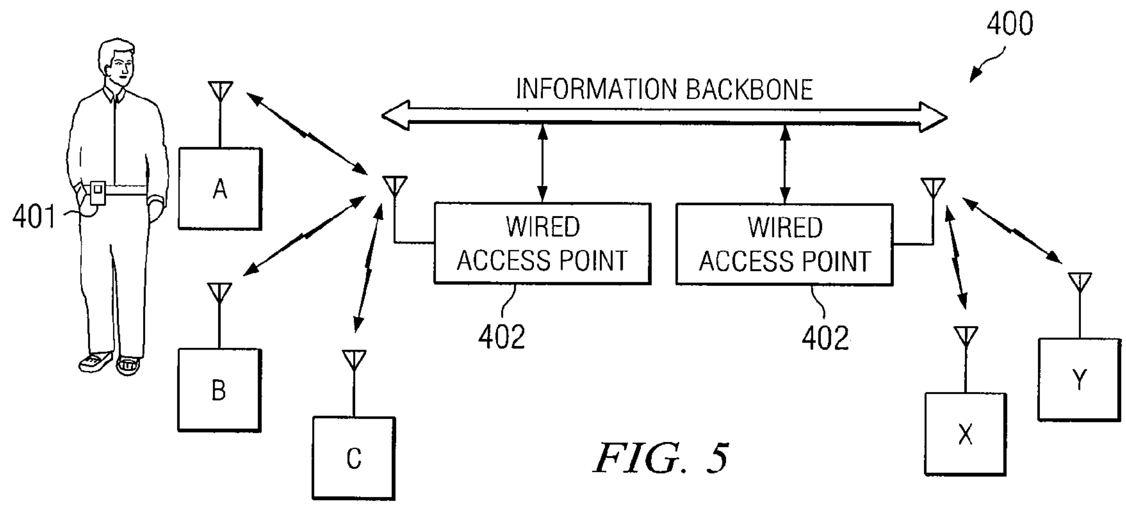
*FIG. 5*
| | PERSONNEL TRACKING | ASSET TRACKING |
|---|---|---|
| CONSTRUCTION SITE | LONG RANGE, REPEATER SIGNAL, LOW SAFETY REQUIREMENT | LONG RANGE, PASSIVE SIGNAL, HIGH VALUE |
| OPERATIONAL FACILITY | SHORT RANGE, TWO-WAY COMMUNICATION SIGNAL, SAFETY CRITICAL | SHORT RANGE, PASSIVE SIGNAL, MEDIUM VALUE |
*FIG. 11*

TAGGING AND TRACKING SYSTEM FOR ASSETS AND PERSONNEL OF A COMMERCIAL ENTERPRISE

RELATED APPLICATION

This application is a continuation of U.S. patent application Ser. No. 10/782,135 filed Feb. 19, 2004 now U.S. Pat. No. 7,123,149, which claims the benefit of U.S. Provisional Application Ser. No. 60/449,013 filed Feb. 21, 2003, the contents of which is hereby incorporated in its entirety by reference.

TECHNICAL FIELD OF THE INVENTION

This invention relates to tracking devices and systems, and more particularly to a system for tagging and tracking assets and personnel associated with a commercial enterprise such as an industrial site.

BACKGROUND OF THE INVENTION

Advances in electronics, wireless communications, and global positioning devices have led to impressive developments in various tracking and tagging devices. Such devices are available for both personal property ("assets") and persons.

In the case of asset tagging, the technology options include passive, semi-passive, and active tags, which are placed on an item of property. These tags differ with respect to factors such as power usage and whether they merely reflect an incoming signal or actively transmit a signal. Passive tags are those that are queried by a radiated source, such as a scanner. Active tags are battery-based and radiate their own signals.

Typically, asset tagging systems are portal based, which means that a tag is queried when the asset to which it is attached is moved through a checkpoint, such as a gateway at an industrial site. Thus, asset tagging devices tend to focus on entry or exit of an asset at a particular location, rather than the item's path of movement.

In the case of personnel, it is especially important to be able to track persons as they move about. Tracking devices may be in accord with any one of a number of different technology options. GPS devices rely on GPS satellite visibility. "Local GPS" devices use local towers that generate GPS-like signals. Cellular devices require cell towers in a given range. Mobile beacon devices transmit a signal that is received by multiple receivers that determine location.

For today's existing tagging and tracking systems, there are a number of communications options. Commercial services, such as cellular, PCS, or paging services, may be leased from an appropriate service provider. Alternatively, for a particular user of a tagging or tracking system, a unique communications network can be established for that user, such as a two-way radio, or wired or wireless Ethernet system.

BRIEF DESCRIPTION OF THE DRAWINGS

FIGS. 4-7 illustrate various configurations of the personnel tracking subsystem of FIG. 2.

FIG. 11 sets out criteria for designing communications links for the tracking subsystems.

DETAILED DESCRIPTION OF THE INVENTION

The invention described herein is directed to a tagging and tracking system that monitors both assets and personnel, and that may use various tagging and tracking devices. These devices, when used in connection with personnel, can also incorporate physiological monitoring features. Safety-related actuating devices, such as locks and valves, can also be integrated into the system.

The various types of tagging, tracking, and monitoring devices are integrated into an information system ("the information backbone"), which permits centralized information gathering and decision making. The information backbone relies on the IP protocol, such that "command and control" applications programs that run on the information backbone are independent of the physical and link layers of the network.

The typical user of the system is a commercial enterprise, and for purposes of example herein, the user is a construction company that desires a secure and safe construction site. However, the same concepts could be applied to any business enterprise, with other examples being industrial sites, power plants, refineries, and ports of entry.

Various scenarios to which the system is designed to respond include terrorist events such as bombings (actual and threatened), accidents such as fires or explosions, or property loss from theft.

System Overview

Figure 1:
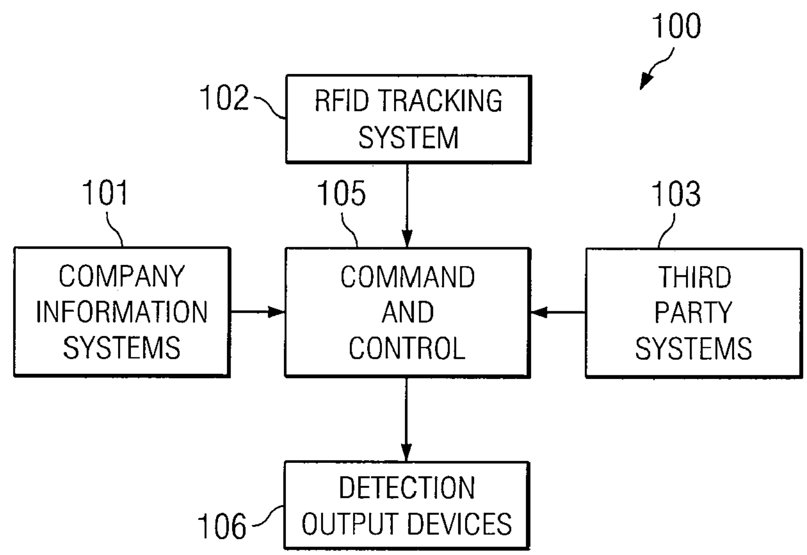
FIG. 1 illustrates a personnel and asset retention system in accordance with the invention.

FIG. 1 illustrates the broadest aspects of a personnel and asset retention system (PARS) 100 in accordance with the invention. System 100 collects information for inventory (tools and materials), security and tracking, as well as for personnel tracking and safety. Each person or asset is uniquely identified by a machine readable code, and wears (or is tagged with) an RFID tag. RFID tags are read by scanners that transmit location and identification data to a command/control unit 105. In addition, the personnel tracking devices communicate directly with the command/control unit 105. A first purpose of system 100 is asset retention, and second is safety for personnel, especially those in need of support during emergencies.

System 100 can be used with existing company information systems 101, various tagging and tracking devices 102, and with third party systems 103. Examples of company databases 101 are material management systems, procurement systems, and time and attendance systems.

The various tagging scanners and tracking devices 102 are in communication with applications programming integrated by additional programming running on an information backbone, with the software and hardware system collectively referred to herein as the command/control unit 105. The applications programming for the tagging and tracking devices 102 is "remote" from those devices in the sense that data from those devices is communicated to the command/control unit 105 via wired or wireless links using an IP protocol.

As explained below, command/control unit 105 receives data from a variety of sensors, which may include readers for machine readable cards and tags, video cameras, temperature and infrared sensors, motion sensors, and others. In addition to collecting data from sensors, command/control unit 105 may be programmed to operate actuators, such as alarms and other signaling devices, door locks, access gates, fire control systems, and process valves. These sensors and actuators are implemented with modular interfaces, so that they may be readily added, interchanged, or moved within a plant or worksite.

The modularity concept is extended to the programming for command/control unit 105. A basic system controls actuators based on the status of specific sensors. The modular design permits removal or addition of sensing devices and software analysis modules, to include signal or image analysis, and to intelligently suggest appropriate output and actuator signals based on pre-generated threat scenarios. Command/control unit 105 can thus be expanded as new processing units are added, new sensor capability becomes available, or new threat conditions arise.

Reporting from the various detection devices 102 is delivered to output stations 106, which may be computer equipment equipped with monitors and other output devices. Any number of commercially available computer-type devices can be used to display information to users.

Communications between command and control unit 105 and the output devices may be wired or wireless and may be networked. WAP (wireless application protocol) links may be made to wireless devices, as well as HTTP links to Internet devices or custom links to proprietary equipment.

As explained below, system 100 integrates the functions of inventory and tracking for assets, and safety and tracking for personnel.

Personnel and Asset Tagging

Figure 2:
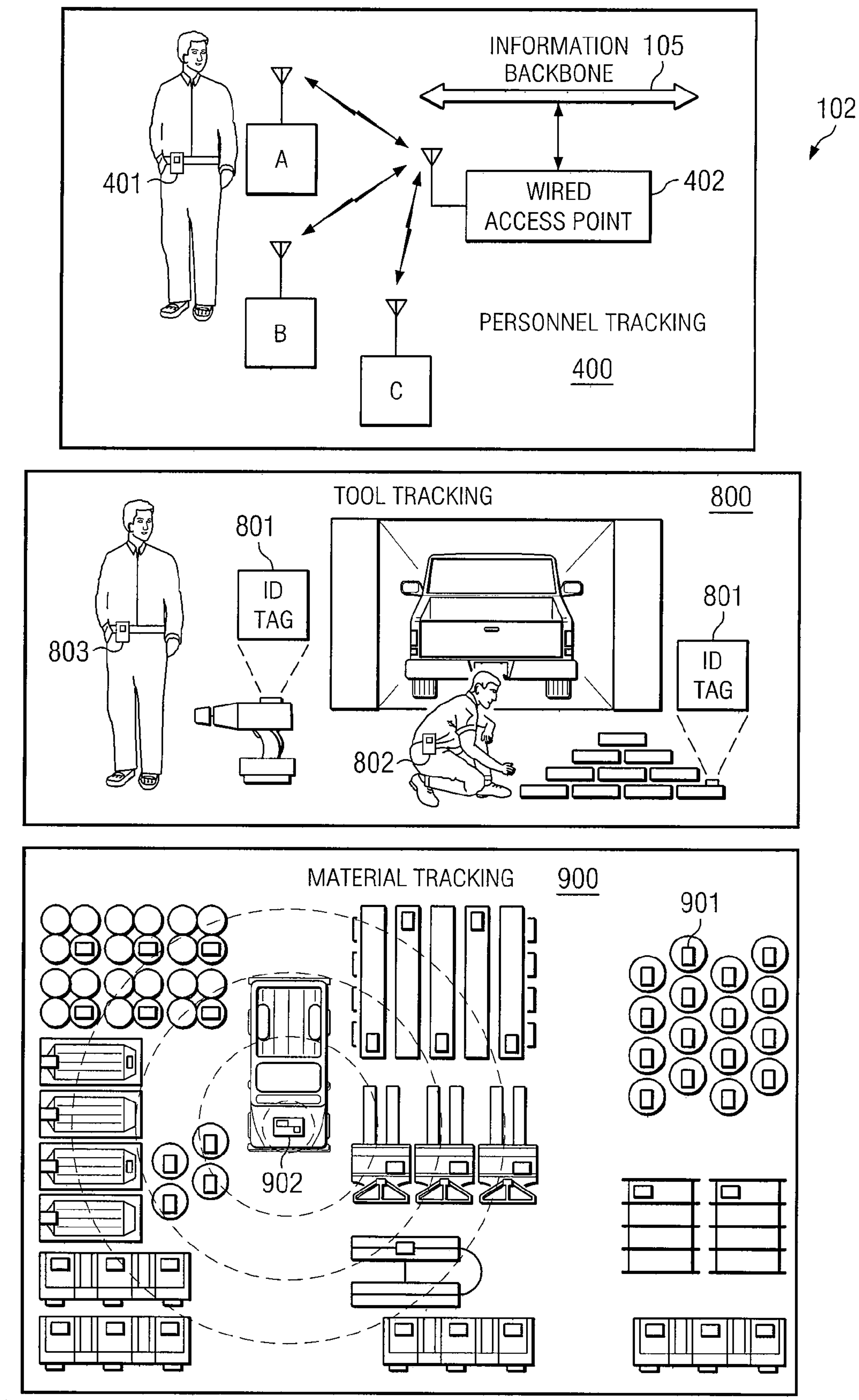
FIG. 2 illustrates the three subsystems within system 100.

FIG. 2 illustrates the three subsystems within system 100. These subsystems are directed to tracking personnel, tools, and materials, respectively, and each uses a different configuration of detection equipment 102.

A personnel tracking subsystem 400 is implemented by equipping personnel with tracking devices 401. Devices 401 are in wireless communication with a wired access point 402, which is in data communications with command/control unit 105. Personnel tracking subsystem 400 is explained in further detail in connection with FIGS. 4-7.

A tool tracking subsystem 800 is implemented by tagging tools with RFID (radio frequency identification device) tags 801. These tags 801 are monitored with mobile or stationary scanning devices 802. For example, mobile scanning devices 802 might be used at a construction site, whereas a stationary scanning device 802 might be used at a tool shed. Tool tracking subsystem is explained in further detail in connection with FIG. 8.

A materials tracking subsystem 900 is implemented by tagging materials 901 with RFID tags. The tagged materials are monitored with a scanning device 903 mounted on a vehicle that travels through the materials yard. Materials tracking subsystem 900 is explained in further detail in connection with FIG. 9.

RFID Tagging for Assets (Tools and Materials)

Figure 3:
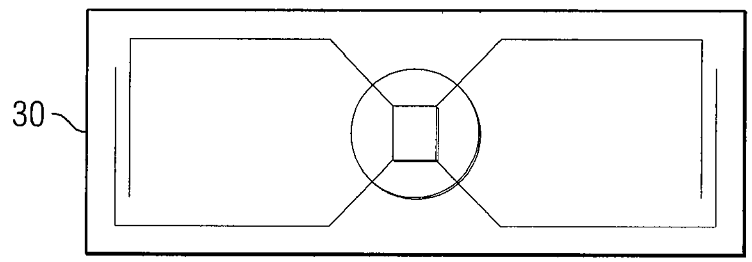
FIG. 3 illustrates an example of an RFID tag.

FIG. 3 illustrates an example of an RFID tag 30 used on assets, such as tools or materials. The tag identifies the item, and may go beyond mere identification, such as by associating the tagged item with a person responsible for the item or a place where it is to be located.

For passive tags, a reader queries the tag, which reflects back the information on the tag. Tags may also be semi-passive or active. They may be read/write or read only, and may have memory for storing data.

Personnel Tracking

FIGS. 4-7 illustrate various configurations of personnel tracking subsystem 400. As stated above, the tracking devices 401 carried by personnel can include a variety of sensors and detectors. The basic tracking device 401 is a geolocation device. Other features may be added to tracking device 401, such as motion detectors to locate persons in accident scenarios or accelerometers to detect falls. Tracking device 401 may be designed to respond to an "aliveness" query, to permit command/control unit 105 to determine if the device 401 is operational and communications can be received.

As explained below in connection with FIGS. 8 and 9A, personnel tracking devices 401 may further include RFID tag readers. These readers permit individuals to be linked to tools and materials and their locations.

Subsystem 400 is implemented with signals between the personnel-carried tracking devices 401 and stationary access points 402. The access points 402 are mounted on towers or buildings, and are connected to the information backbone via a LAN.

As illustrated in FIG. 5, to extend the range of subsystem 400, more access points 402 may be added.

Figure 6:
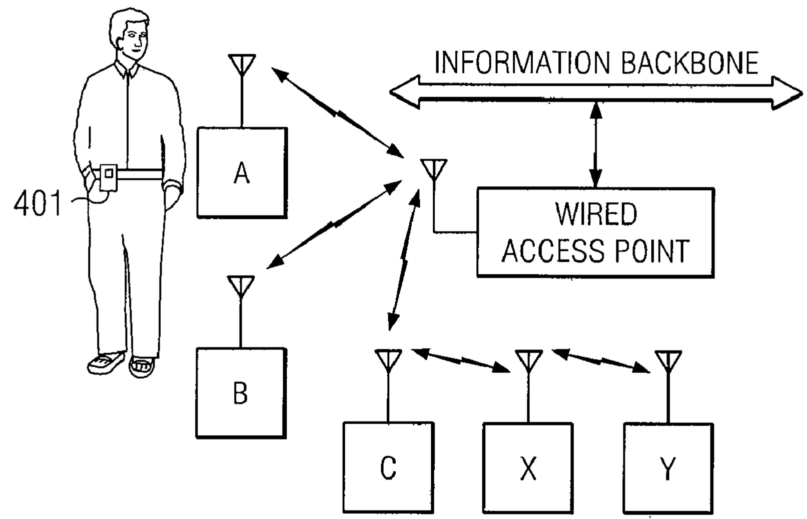

Or, as illustrated in FIG. 6, wireless ad hoc networking can be used, such that the devices 401 can relay information to each other. If a device is not within range of a network access point 402, messages may be sent through a chain of other devices.

Figure 7:
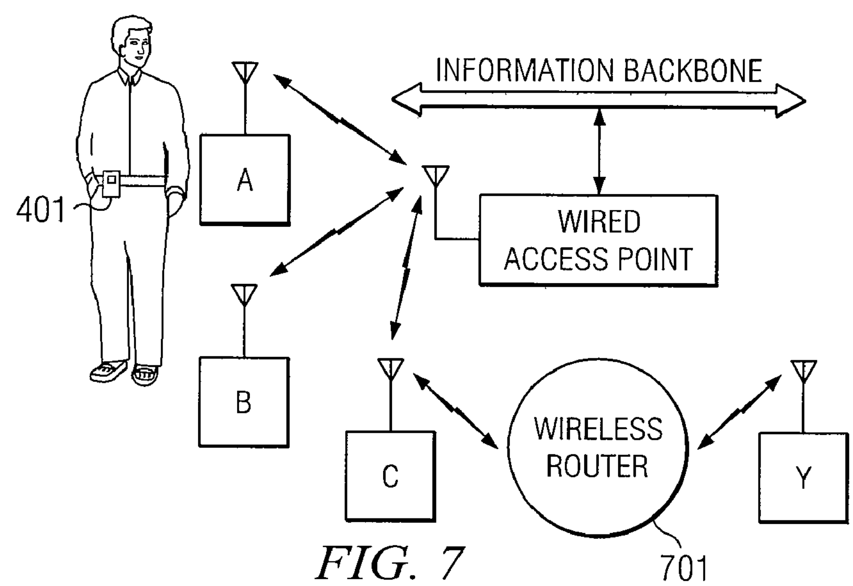

FIG. 7 illustrates how wireless routers 701 using packet-based communications can be used to relay communications between devices 401, to further extend range.

For voice communications, the personnel tracking devices 401 can include voice over IP (VoIP) capability, providing two-way radio-type capabilities. Thus, if desired, the tracking capabilities of system 400 can be extended to provide two-way communication with personnel.

The tracking devices 401 can also include environmental sensors for monitoring purposes. Thus, employees can be located, communicated with, and monitored for safety purposes. These environmental sensors can be multi-sensor devices, such as commercially available heat-stress monitors.

The various monitoring, tracking, and communications devices 401 are all endpoints of the same IP-based communications network. Wired or wireless IP telephonic devices can be used over the same network as the tracking devices 401, provided they are within range of a network access point 402. Network bandwidth may be allocated to accommodate an expected number of simultaneous conversations.

Asset (Tool and Material) Tracking

Figure 8:
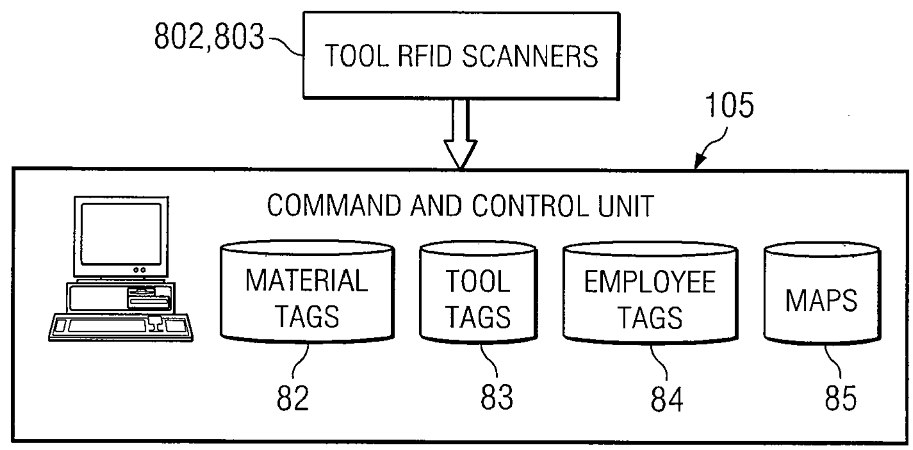
FIG. 8 illustrates the data flow for the tool tracking subsystem.

FIG. 8 illustrates the information flow for tool tracking subsystem 800. Referring again to FIG. 2, for the most fundamental approach to tool tracking, a passive RFID tag 801 is placed on each tool. The "tools" may be hand tools, power tools, or any other mobile or stationary other equipment.

RFID scanners 802 are used at portals to detect when a tool is entering or leaving. The link between the RFID scanners 802 and the information backbone 105 is a SNMP/IP protocol link. The information backbone 105 provides access to databases, such as an RTD and tag identifier databases.

The tool tracking subsystem 800 can be made more "intelligent" with read/write passive RFID tags.

Tool tracking can also include non-portal solutions, such as by using RFID transceiver devices 803 coupled with geolocation tracking. To this end, tags may be queried when they come into close proximity to a personnel tracking device 401. At each query, the location of the tool is sent along with its ID code. This permits command/control unit 105 to store a location of the tool anytime it is used or transported, and to further store the identification of the personnel who was last in close proximity to that tool.

FIG. 8 further illustrates various databases 81-85 in communication with command/control station 105. For purposes of tools tracking, a tool tag database 83 correlates tool ID codes and other information read from each tool tag 801 by a scanner 802 Or 803, to additional data about the associated tool. Database 83 may be continually updated as tools are scanned. Databases 82 and 84 operate in a similar manner for tracking systems 400 and 900, respectively. A maps database 85 correlates scanned geographical data from tool tags 801 to visually perceptible map information. Maps and histories can be assembled by gathering the scanned data.

Figure 9A:
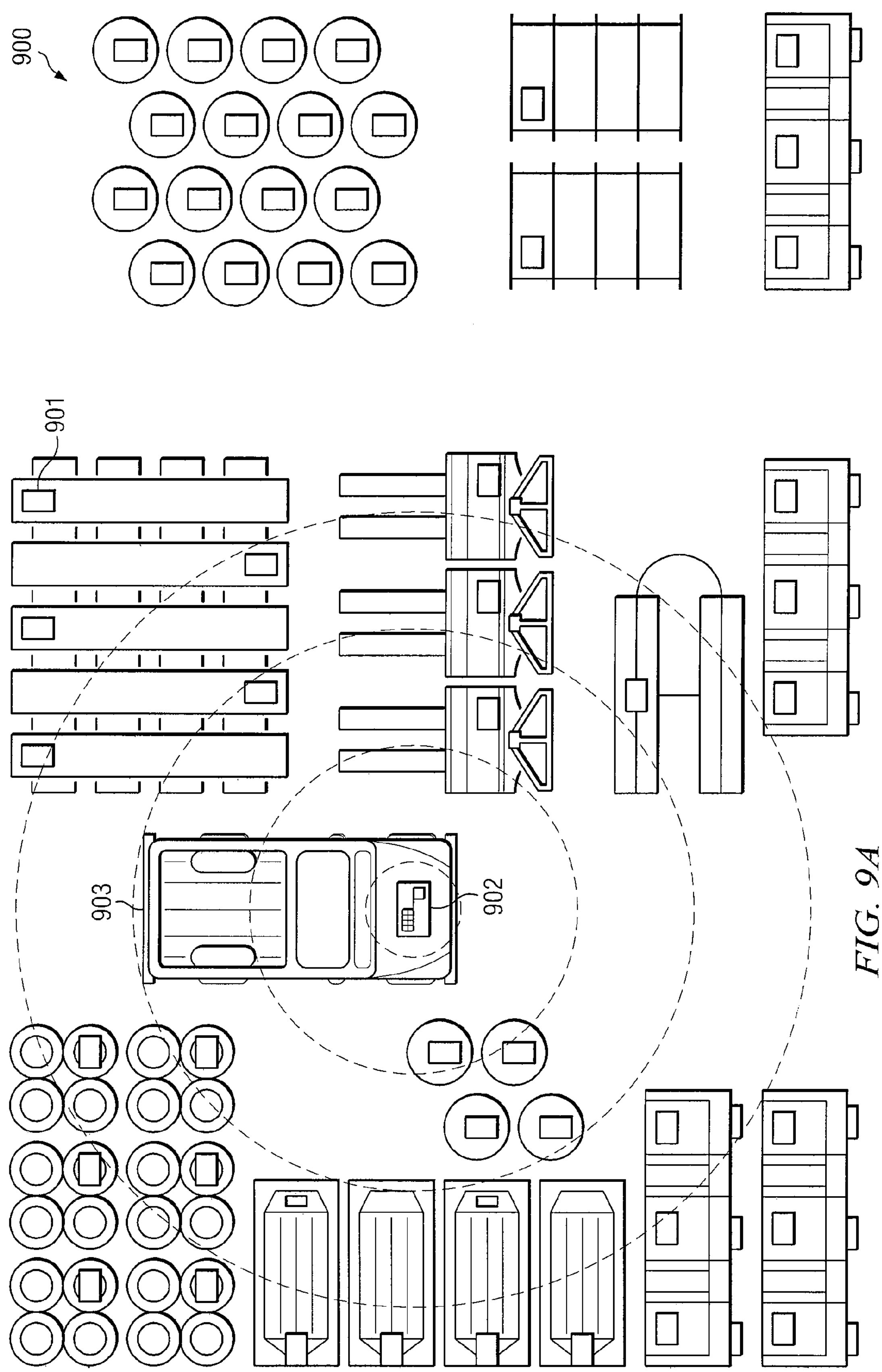
FIG. 9A illustrates the materials tracking subsystem.
Figure 9B:
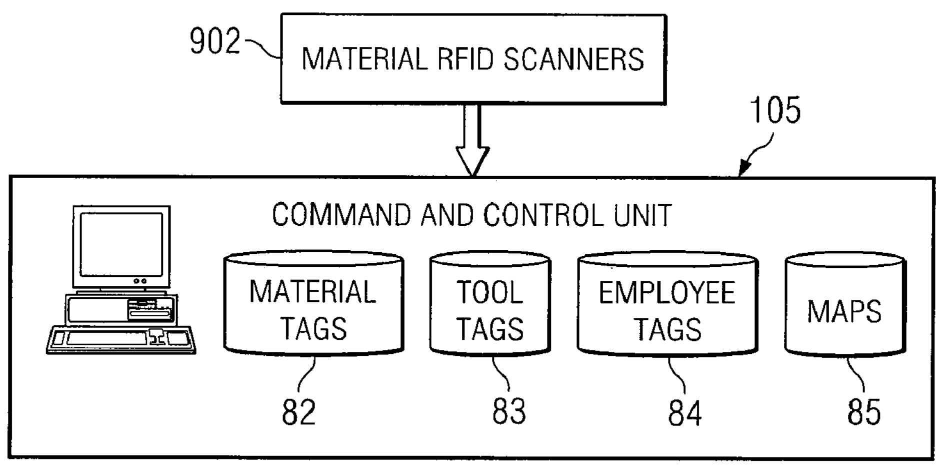
FIG. 9B illustrates the data flow for the materials tracking subsystem.

FIG. 9A illustrates the material tracking subsystem 900. Tags 901 are placed on items of material in a yard. RFID scanners 902 are placed on vehicles 903, which move through the yard, detecting material in range of the scanner 902. If the vehicle location is known, such as by using GPS, the location of the material is also known. In this manner a storage or laydown area can be inventoried by doing a walk-through or drive-through with a radiated query source, using passive tags on the materials.

The readers for tool and material tags are capable of operation inside buildings as well as in large exterior locations.

FIG. 9A illustrates the information flow for materials tracking subsystem 900. The command/control station 105 accesses a materials tag database 82, as well as maps database 85. The databases are used and updated in a manner similar to those associated with tool tracking subsystem 800 as described above.

Figure 10:
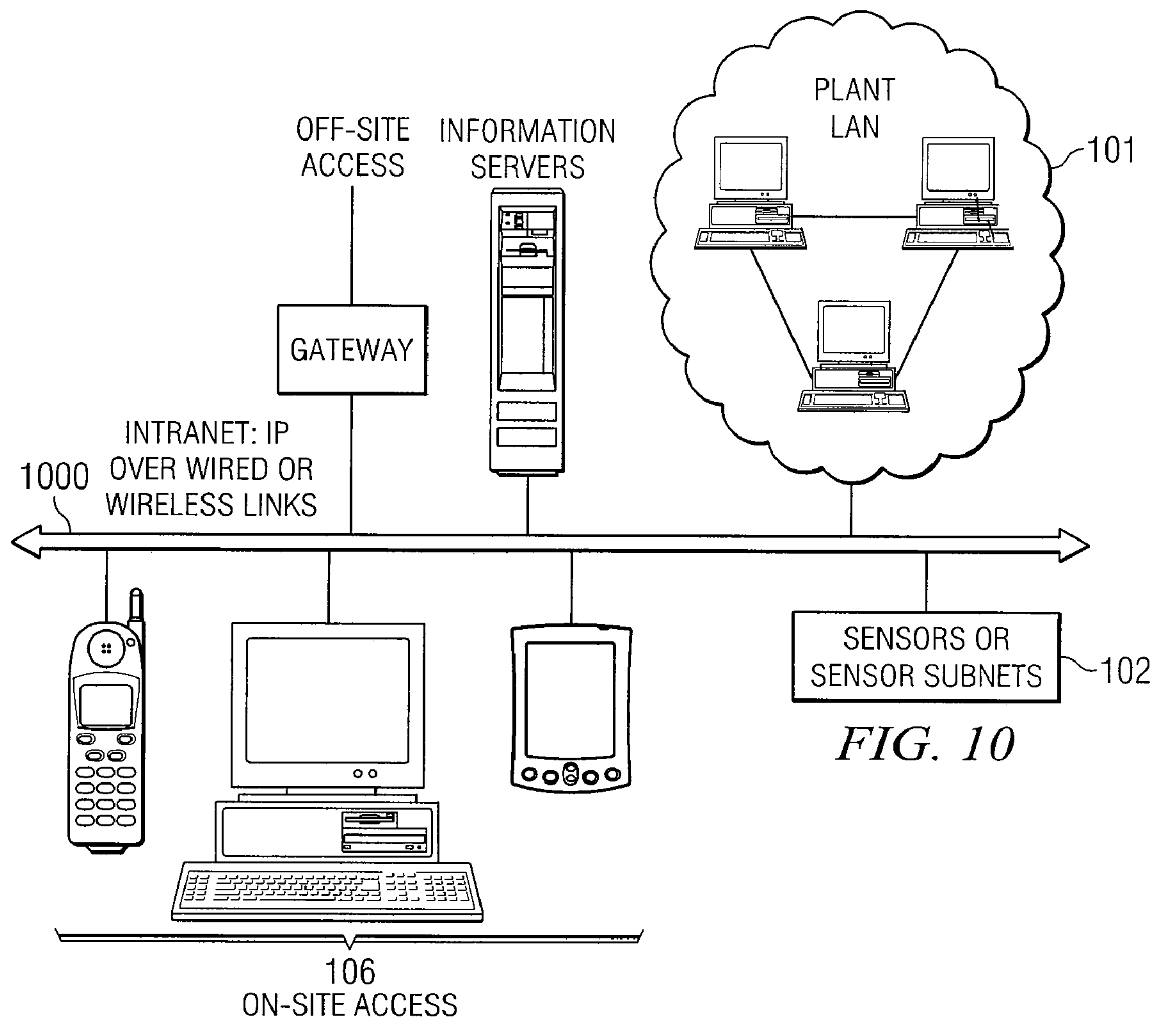
FIG. 10 illustrates various aspects of the information backbone.

FIG. 10 illustrates various aspects of the information backbone. The basic structure is that of an intranet 1000, using wired or wireless links to the remote tags and tracking devices of subsystems 400, 800, and 900.

All subsystems are integrated into the same intranet 101. These subsystems may use an SNMP/IP (Simple Network Management Protocol/Internet Protocol) link for communications between the scanners and the information backbone, used for communications with command/control unit 105. The various subsystems may use different network protocols, but a physical IP interface connects them to an IP information backbone.

FIG. 11 sets out criteria for designing communications links for the tracking devices of systems 400, 800, and 900. Three criteria are presented: transmit/receive range, type of signal, and purpose of the device. For example, asset tracking at a construction site may require a long transmission range. For assets that are high valued and do not leave the site, passive devices can be used, such that a signal is transmitted when a perimeter is crossed. In contrast, personnel tracking at an operational facility requires short range transmission to a local receiver station. However, because individuals may be in enclosed locations, or may be in toxic or otherwise hazardous environments, then two-way communications with location and life-signs are appropriate to monitor the individuals.

The purpose of the information backbone of command/control unit 105 is to provide a single integration point, so that as new subsystems are developed they can be easily connected. By having a single information backbone for all subsystems, a single user workstation could be used to access all data on the backbone. To this end, "plug-in" programming techniques, such as those used by web browsers, may be used. Various user interface devices may be used, such as personal computers, wireless personal digital assistants (PDAs), wireless (WAP) enabled cell phones, and two way pagers with or without text.

Various other systems connected on the intranet 101 may include information servers, off-site access via a gateway, on site user interface devices, and the various tracking and tagging subsystems. For information access to these other systems, standard formats such as XML and HTML are used. Legacy and third party systems can be integrated into the backbone. The result is a "one computer" view of the security, safety, tracking, and tagging for an entire business enterprise.

The output of command/control unit 105 may include graphical presentations. Such output may be used to provide a high level or detailed view of current data acquired as well as permitting specific device data to be interrogated. For example, an output display might be of a map of an entire site. The map may include locations of security devices, displayed as icons with color coding for status. The user may "click" on the icon to obtain additional data about and from the device. For objects or persons having tracking devices, the current position could be displayed. Clicking on an icon can provide more information about the object and its movement history.

What is claimed is:

1. A system for monitoring assets and personnel associated with a business enterprise, comprising:

a tools tagging subsystem having: RFID tags placed on items of property, portal scanners for querying the tags and receiving tag data at a portal, a tools database for storing tool data, and remote tools programming for collecting the tool data, wherein the portal scanners are in data communication with the tools programming;

a personnel tracking subsystem having: geolocation personnel tracking devices carried by personnel, stationary access points for wirelessly communicating with the tracking devices, a personnel database for storing personnel data, and remote personnel programming for collecting the personnel data, wherein the stationary access points are in data communication with the personnel programming;

wherein the personnel tracking devices are operable to read RFID tags on tools;

wherein each personnel tracking device has at least one sensor for monitoring at least one physiological feature of the personnel;

a command and control subsystem for integrating the tools programming and database and the personnel programming and database;

wherein the command and control subsystem has at least one monitoring station for receiving RFID data from the tools tagging subsystem and the personnel tracking subsystem.

2. The system of claim 1, wherein the command and control system is further operable to associate a specified personnel with at least a location and a physiological status by receiving data from a personnel tracking device carried by that personnel.

3. The system of claim 1, wherein the at least one physiological feature is selected from the group: temperature, movement, or breathing.

4. The system of claim 1, wherein the command and control system is further operable to associated a specified personnel with at least one tool.

5. The system of claim 1, wherein the command and control system is further operable to activate an alert process based on sensor data from a personnel tracking device.

6. The system of claim 1, further comprising a materials tagging subsystem comprising: RFID tags placed on items of property, mobile scanners for querying the tags and receiving tag data, a materials database for storing materials data, and remote materials programming for collecting the materials data, wherein the mobile scanners are in wireless data communication with the materials programming.

7. The system of claim 1, wherein the command and control programming communicates with the programming of at least one of the other subsystems using IP protocol.

8. The system of claim 1, wherein the personnel tracking subsystem is implemented as a wireless ad hoc network.

9. The system of claim 1, further comprising a maps database, and wherein the command and control subsystem is operable to access the maps database and display locations of materials based on input from the materials tagging subsystem.

10. The system of claim 9, wherein materials are displayed as clickable icons on the map, such that clicking an icon results in a display of additional data about a material.

11. The system of claim 1, further comprising a maps database, and wherein the command and control subsystem is operable to access the maps database and display locations of tools based on input from the tools tagging subsystem.

12. The system of claim 11, wherein tools are displayed as clickable icons on the map, such that clicking an icon results in a display of additional data about a tool.

13. The system of claim 1, further comprising an actuator subsystem having at least one actuator operable in response to communications from the command and control subsystem.

14. The system of claim 1, wherein the personnel tracking devices incorporate at least a two way communications device.

15. The system of claim 1, wherein the command and control programming communicates with programming of at least one of the other subsystems using a wireless communications protocol.

16. The system of claim 1, wherein the tool tagging subsystem communicates the location and ID of a tool to the command and control subsystem.

17. The system of claim 1, wherein the stationary access points are in communication with the personnel programming by means of a LAN.

18. The system of claim 1, wherein the materials tagging subsystem is operable to alert the command and control subsystem when a tagged item of material crosses a specified perimeter.

* * * * *